United States Patent

Kaminski et al.

[11] Patent Number: 5,929,550
[45] Date of Patent: Jul. 27, 1999

[54] VENTILATED CREEPAGE BLOCKS

[75] Inventors: Christopher Anthony Kaminski, Niskayuna; Peter Wallace Robson, Schenectady, both of N.Y.

[73] Assignee: General Electric Co., Schenectady, N.Y.

[21] Appl. No.: 08/821,375

[22] Filed: Mar. 20, 1997

[51] Int. Cl.⁶ ..................................................... H02K 3/48
[52] U.S. Cl. .......................... 310/214; 310/215; 310/216; 310/217; 310/218; 310/261; 310/270
[58] Field of Search ..................................... 310/214, 215, 310/216, 217, 218, 270; 29/596, 598

[56] References Cited

U.S. PATENT DOCUMENTS

| | | |
|---|---|---|
| 4,390,806 | 6/1983 | O'Brien et al. ........................ 310/261 |
| 4,473,765 | 9/1984 | Butman, Jr. et al. ................... 310/215 |
| 4,486,676 | 12/1984 | Moore et al. .............................. 310/52 |
| 4,859,891 | 8/1989 | Jenkins et al. .......................... 310/215 |
| 5,065,064 | 11/1991 | Kaminski ................................ 310/215 |
| 5,122,698 | 6/1992 | Walker et al. .......................... 310/214 |
| 5,174,011 | 12/1992 | Weigelt ...................................... 29/598 |
| 5,329,197 | 7/1994 | Kudlacik ................................. 310/198 |

Primary Examiner—Elvin G. Enad
Attorney, Agent, or Firm—Nixon & Vanderhye

[57] ABSTRACT

A creepage block for a turbine rotor slot in which coil windings are embedded, wherein the creepage block is sandwiched between the windings and a wedge block, and wherein aligned radial cooling passages are formed in axially spaced locations in the windings and the wedge block. The creepage block includes a pair of solid half blocks in substantially parallel relationship, the blocks held in laterally spaced relation by a plurality of discrete spacers which may be dowel pins.

10 Claims, 4 Drawing Sheets

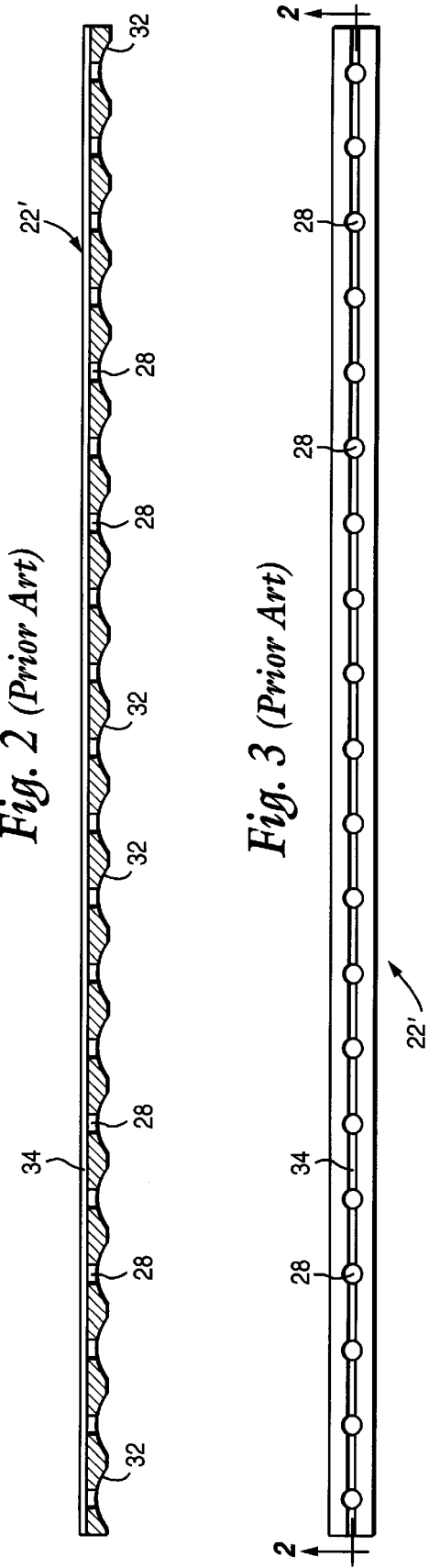
Fig. 2 (Prior Art)
Fig. 3 (Prior Art)
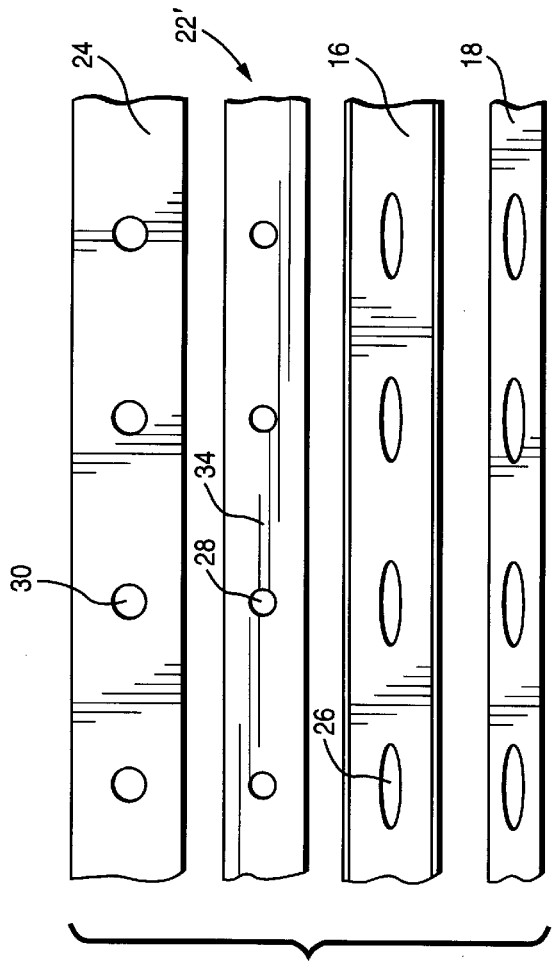
Fig. 4 (Prior Art)

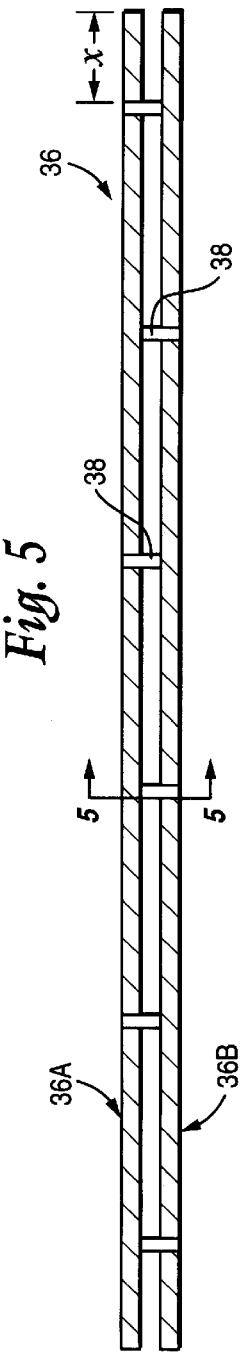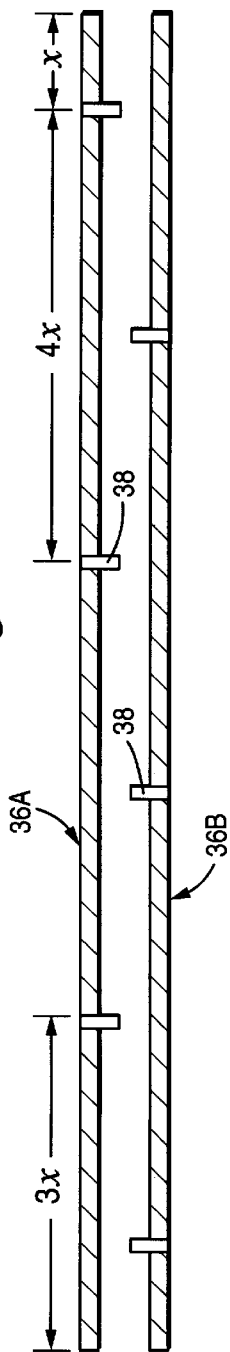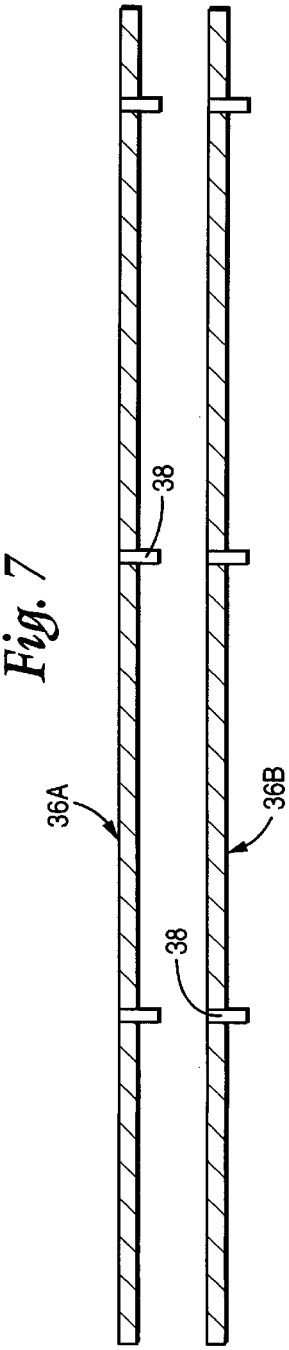

VENTILATED CREEPAGE BLOCKS

TECHNICAL FIELD

This invention relates generally to a rotor cooling system for an electrical power generator utilizing radial cooling manifolds along the axial length of the rotor field turns or windings, and, specifically, to ventilated creepage blocks in such systems.

BACKGROUND

Generator rotors are provided with radial slots about the periphery thereof, for receiving field or rotor windings of coils made up of a number of turns in a radially stacked arrangement, each turn or winding separated by insulation. The windings are retained in each slot by one or more full-length wedges, with one or more creepage blocks interposed between the wedges and the windings. The function of the wedge block is to contain the contents of the rotor slot against outward radial forces arising from rotation of the rotor. The creepage block serves as an insulating barrier between the wedge and the copper windings. The creepage block is also formed with apertures which permit cooling gas to flow from radial passages in the copper windings to radial passages in the wedge.

Generators currently available from the assignee are placed in three major design classifications based on the cooling medium used: air, hydrogen or liquid (water). All hydrogen and water cooled generators use direct conductor cooling of the rotor windings for heat removal. Smaller two-pole and all four-pole generators use the radial flow design.

In such radial flow systems, the field windings imbedded in the rotor slots are ventilated by a radial cooling circuit consisting of an axial sub-slot and a series of radial cooling passages. To maximize cooling gas flow in the radial direction and electrical conductance in the axial direction of the winding, the axially spaced radial flow cooling ducts are elongated in the axial direction. To minimize stresses in the rotor wedges, the last leg of each radial cooling path is a round hole. The problem to be solved is a cost-effective optimization of the transition via the creepage block from elongated ducts in the copper windings to the circular holes in the wedge without incurring undesirable pressure losses that would undermine the thermal performance of the ventilation circuit.

Historically, the creepage block radially between the wedge and the coil windings has been made by introducing a multitude of geometric features for each radial passage. In one example, cylindrical holes are drilled concentric with each wedge hole. Circular arches are then machined on the radial inboard surface of each creepage block to match the elongated ducts in the windings. Finally, a shallow axial groove is machined through the radially outboard surface of each wedge to allow for small variations in alignment between the creepage block and the wedge block. This conventional arrangement is illustrated in FIG. 1 (described in detail further below).

DISCLOSURE OF THE INVENTION

The primary objectives of the present invention are summarized below:

(1) to simplify the creepage block geometry,
(2) to eliminate unnecessary machining of the blocks,
(3) to allow designs with different duct pitch to be accommodated by a single creepage block geometry,
(4) to maximize flow through the creepage block,
(5) to provide for precise dimensioning across the block, and
(6) to provide for transfer of compressive stresses radially through the block.

In accordance with an exemplary embodiment of the invention, the creepage block consists of two half blocks, separated at axial intervals by a plurality of dowels. Each half block includes an elongated, rectangular solid, one side of which is formed with a plurality of longitudinally spaced dowels. The half blocks are identical to each other but, in use, one is turned 180° so that the blocks present mirror images to each other and, as a result, the dowels alternate in an axial direction, as explained in greater detail further below.

With this simplified creepage block construction, all of the objectives set forth above are met with significant reduction in manufacturing costs. Moreover, the invention may be put to good use on any directly cooled field with radially directed ventilation, specifically:

(1) rotors with radial flow ventilation; and
(2) rotors with center discharge ventilation.

The concept applies to both 2 pole and 4 pole rotors. It also applies equally well to C-coil field windings and to square corner field windings.

In accordance with its broader aspects, therefore, the present invention relates to a creepage block for a turbine rotor slot in which coil windings are embedded, wherein a wedge block is sandwiched between the windings and the creepage block and wherein aligned radial cooling passages are formed in axially spaced locations in the windings and the wedge block, the creepage block comprising a pair of solid half blocks in substantially parallel relationship, the blocks held in laterally spaced relation by a plurality of discrete spacers.

Other objects and advantages of the invention will become apparent from the detailed description which follows.

BRIEF DESCRIPTION OF THE DRAWINGS

FIG. 2 is a cross section taken along the line 2—2 of FIG. 3, illustrating a conventional creepage block construction;

FIG. 3 is a plan view of the creepage block of conventional structure;

FIG. 4 is a partially exploded view illustrating an arrangement of a creepage block, wedge, coil winding, and insulation in a conventional rotor construction;

FIG. 5 is a cross section of a creepage block in accordance with an exemplary embodiment of this invention;

FIG. 6 is a sectional view similar to FIG. 5, but with the creepage half blocks separated from one another;

FIG. 7 is a cross section of two creepage half blocks as shown in FIG. 6 but with the lower creepage block rotated 180°;

BEST MODE FOR CARRYING OUT THE INVENTION

Figure 1:
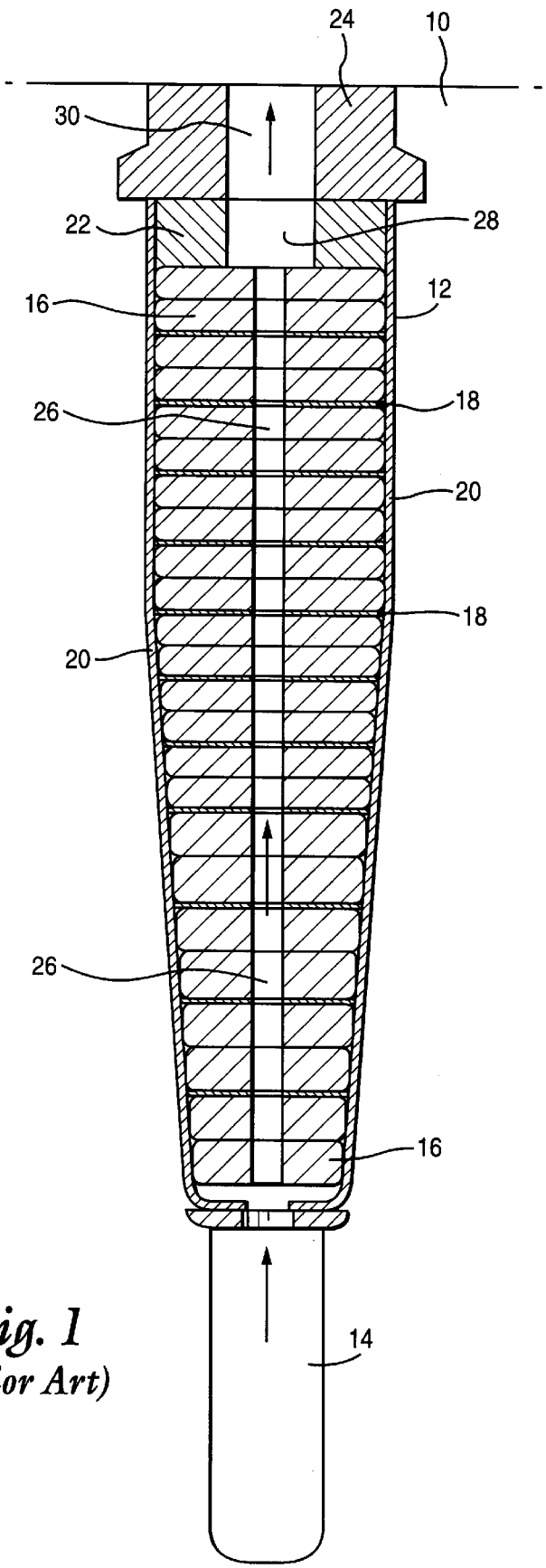
FIG. 1 is a sectional view of a conventional radial coil slot in a rotor in illustrating the location of a creepage block between the coil windings and wedge blocks.

FIG. 1 illustrates a cross section of a rotor slot in a conventional generator rotor. A typical generator rotor has a cylindrical rotor body 10 with 20–40 such slots (one indicated at 12) distributed radially around the periphery of the rotor. At the lower end of the rotor slot, there is an axially extending sub-slot 14 which extends substantially the full length of the rotor. Within each slot 12, there are a plurality of copper windings or turns 16 separated individually or in multiple layers by insulation 18. The slot itself is also lined with insulation 20. At the upper end of the slot, there is an elongated creepage block 22, with the copper windings or turns 16 and the creepage block 22 held within the slot by one or more wedge blocks 24. As illustrated in FIG. 1, the windings 16 are punched at axially spaced locations to form a plurality of axially spaced coolant passages 26, each of which extends radially outwardly from the sub-slot 14, through aligned holes 28, 30 in the creepage block and wedge block 24, respectively, to an air gap extending axially between the rotor and the stator.

FIG. 2 is a side section of a conventional creepage block 22' which is formed with a plurality of holes 28 at axially spaced locations along the creepage block. The spacing between the holes 28 corresponds with the axial spacing between the holes punched in the copper windings 16, and the axially spaced holes 30 in the wedge block 24. Circular arches 32 are machined in the lower surface of the creepage block, so that each hole 28 has its own circular arch 32. The circular arches are intended to match the cross-sectional elongated holes 26 in the copper winding, thus providing a transition from the axially elongated holes to the round holes in the wedge block. In addition, a shallow axial groove 34 is machined on the radially outer surface of the creepage block along the length of the latter, and in axial alignment with the holes 28 as best seen in FIG. 3. This axial groove allows for small variations in the alignment of the holes 28 with the round holes in the wedge block 24. As will be appreciated, the various geometric features incorporated into each creepage block, including holes 28, arches 32 and groove 34, result in high manufacturing costs due not only to the sheer number of operations, but also to the requirement for precision alignment between the various components within the slot.

Turning now to FIGS. 5–7, a creepage block 36 in accordance with an exemplary embodiment of this invention is illustrated. The creepage block consists of a pair of elongated, rectangular half blocks 36A and 36B separated from each other by a plurality of dowels 38A, 38B, respectively. More specifically, each half block consists of an elongated rectangular solid N with dowels 38 (the drawing figures illustrate a case where N=3), axially spaced along the block. The length of each half block can be defined as being 4Nx units long, where the first dowel from the right end of half block 36A is located a distance x from the end. The first dowel from the left end is located a distance 3x from the end (FIG. 6). The remaining dowels are spaced 4x units apart. When matched with an identical (i.e., mirror image) half block, (as represented in FIGS. 5–7), the dowels become interleaved, thereby producing a repetitive pattern with a pitch of 2x units in length. For optimum ventilation, the pitch length 2x should be an integral multiple of the radial copper duct pitch for each of the designs for which the creepage block is intended to be used.

For example, if the design is to be used for radial flow designs with both 2" and 3" duct pitch then 2x should equal 6 inches, as six is an exact multiple of both 2 and 3.

Figure 8:
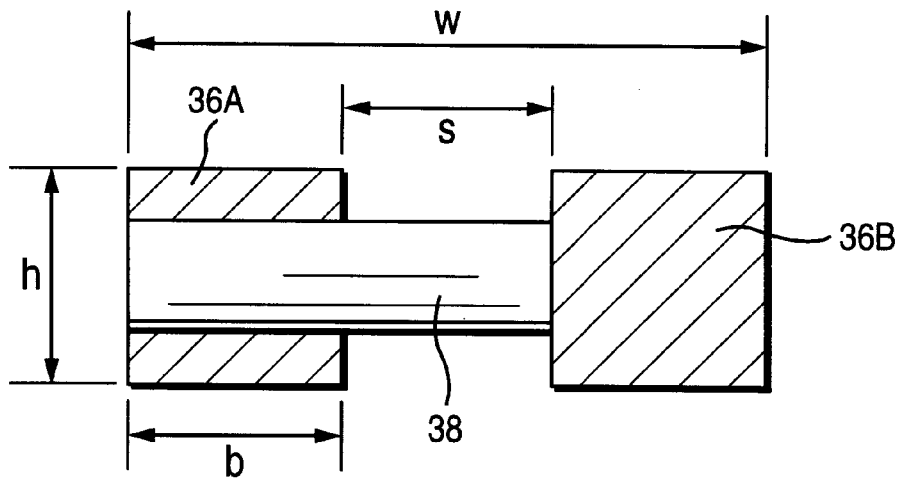
FIG. 8 is a section along the line 8—8 of FIG. 5.
Figure 9:
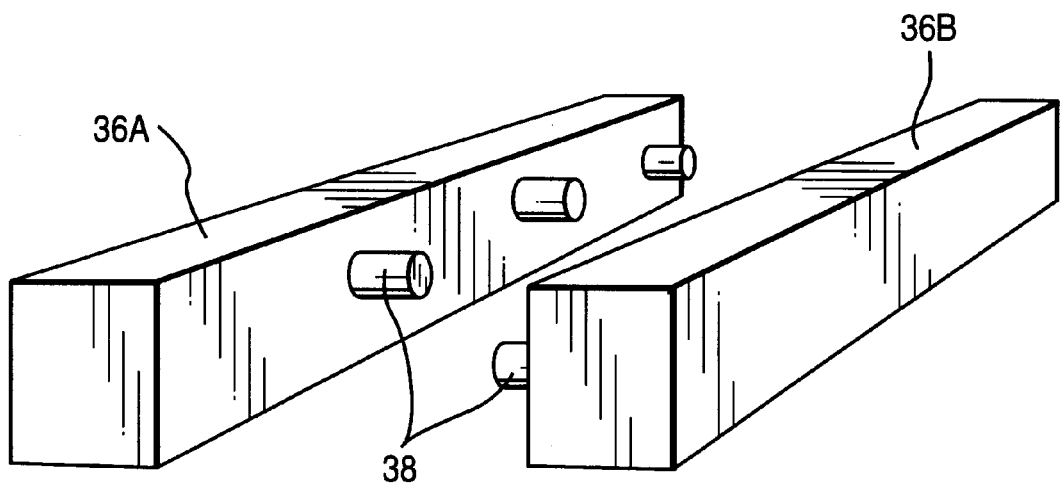
FIG. 9 is a perspective view of the separated creepage half blocks in accordance with the invention.

To obtain optimum ventilation, the spacing between the blocks is held to a precise dimension. This spacing is defined by the variable "s" (see FIG. 8). To avoid the difficulties of obtaining a tight tolerance with a blind hole, the dowel should be extended across the entire width of the solid block. Thus, with reference to FIG. 8, the length of each dowel 38 should be defined by the quantity, b+s, where "b" defines the width of the block (across the slot width), and "s" defines the desired spacing between the two rectangular solids that make up the creepage block. The quantity "h", in this figure, defines the height of the block (in the radial direction when assembled in the rotor slot).

It will be seen that the creepage block design in accordance with this invention achieves all of the objectives outlined above in a relatively simple arrangement of low cost, easy to manufacture components.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A creepage block for a turbine rotor slot in which coil windings are received, wherein the creepage block is, in use, radially sandwiched between the windings and a wedge block, and wherein aligned radial cooling passages are formed in axially spaced locations in said windings and said wedge block, said creepage block comprising:

a pair of solid half blocks in substantially parallel side-by-side relationship, said blocks held in laterally spaced relation by a plurality of discrete spacers.

2. The creepage block of claim 1 wherein said spacers comprise dowel pins extending alternatively from oppositely facing sides of said half blocks.

3. The creepage block of claim 2 wherein said dowel pins are equally spaced in the axial direction.

4. The creepage block of claim 3 wherein said half blocks, when assembled, are mirror images of each other.

5. The creepage block of claim 2 wherein said dowel pins have a pitch length which is an integral multiple of a corresponding pitch length for the radial cooling passages in the windings.

6. The creepage block of claim 2 wherein each dowel pin has a length equal to the sum of a width dimension parallel to the pin and a lateral spacing between the half blocks.

7. The creepage block of claim 2 wherein said dowel pins have a pitch length which is an integral multiple of a corresponding pitch length for the radial cooling passages in the windings.

8. A creepage block for a turbine rotor slot in which coil windings are received, wherein the creepage block is, in use, radially sandwiched between the windings and a wedge block, and wherein aligned radial cooling passages are formed in axially spaced locations in said windings and said wedge block, said creepage block comprising:

a pair of solid half blocks in substantially parallel side-by-side relationship, said blocks held in laterally spaced relation by a plurality of discrete spacers, wherein said spacers comprise dowel pins extending alternatively from oppositely facing sides of said half blocks, and wherein each said dowel pin is received in a hole in a corresponding one of said half blocks, said hole extending completely through said corresponding half block.

9. The creepage block of claim 8 wherein each pin extends through substantially the full thickness of said corresponding half block.

10. In a turbine rotor having a plurality of radially extending coil slots, each slot having a plurality of windings received therein, said windings held in each said slot by at least one axially extending wedge block and at least one axially extending creepage block, with said creepage block radially sandwiched between said windings and said wedge block, and wherein said windings and said wedge block have a plurality of axially spaced radially extending coolant passages, an improved creepage block comprising a pair of solid half blocks in substantially parallel relationship, said blocks held in laterally spaced relation by a plurality of discrete spacers.

* * * * *